US009950819B2

(12) United States Patent
Fujitani

(10) Patent No.: US 9,950,819 B2
(45) Date of Patent: Apr. 24, 2018

(54) TABLET PACKING METHOD AND TABLET PACKING APPARATUS

(75) Inventor: Noboru Fujitani, Kadoma (JP)

(73) Assignee: Takazono Corporation, Osaka (JP)

( * ) Notice: Subject to any disclaimer, the term of this patent is extended or adjusted under 35 U.S.C. 154(b) by 735 days.

(21) Appl. No.: 14/381,483

(22) PCT Filed: Feb. 28, 2012

(86) PCT No.: PCT/JP2012/054975
§ 371 (c)(1),
(2), (4) Date: Aug. 27, 2014

(87) PCT Pub. No.: WO2013/128580
PCT Pub. Date: Sep. 6, 2013

(65) Prior Publication Data
US 2015/0096262 A1 Apr. 9, 2015

(51) Int. Cl.
*G06F 7/00* (2006.01)
*B65B 9/087* (2012.01)
(Continued)

(52) U.S. Cl.
CPC ................ *B65B 9/087* (2013.01); *B65B 9/06* (2013.01); *B65B 35/30* (2013.01); *B65B 41/12* (2013.01); *B65B 57/20* (2013.01); *B65B 61/025* (2013.01); *B65B 61/06* (2013.01); *B65B 61/26* (2013.01); *G07F 11/68* (2013.01); *G07F 17/0092* (2013.01); *B65B 35/06* (2013.01); *B65B 2220/22* (2013.01)

(58) Field of Classification Search
None
See application file for complete search history.

(56) References Cited

U.S. PATENT DOCUMENTS 4,911,304 A * 3/1990 Bunin .................. B65D 75/327 206/469
5,036,643 A * 8/1991 Bodolay ................ B65B 9/093 156/66
(Continued)

FOREIGN PATENT DOCUMENTS

CN 1604867 A 4/2005
CN 200964216 Y 10/2007
(Continued)

OTHER PUBLICATIONS

Office Action re Japanese Application No. 2014-501884, dated Sep. 30, 2016.
(Continued)

*Primary Examiner* — Yolanda R Cumbess
(74) *Attorney, Agent, or Firm* — The Webb Law Firm

(57) ABSTRACT

Provided is a tablet packing method including: a step of conveying a long sheet material that is a material of a packing bag in a longitudinal direction; a step of introducing all of a same kind of tablets of the tablets prescribed to each patient to a packing space formed by the conveyed long sheet material; a step of sealing the long sheet material to form a section in which the packing space provided with the tablets is airtight; and a step of cutting the long sheet material provided with one or a plurality of the sections, in predetermined units in the longitudinal direction.

7 Claims, 5 Drawing Sheets

(51) Int. Cl.

| | |
|---|---|
| ***B65B 9/06*** | (2012.01) |
| ***G07F 17/00*** | (2006.01) |
| ***B65B 35/30*** | (2006.01) |
| ***B65B 41/12*** | (2006.01) |
| ***B65B 57/20*** | (2006.01) |
| ***B65B 61/06*** | (2006.01) |
| ***B65B 61/26*** | (2006.01) |
| ***G07F 11/68*** | (2006.01) |
| ***B65B 61/02*** | (2006.01) |
| *B65B 35/06* | (2006.01) |

(56) References Cited

U.S. PATENT DOCUMENTS

| | | | | |
|---|---|---|---|---|
| 6,792,736 | B1 | 9/2004 | Takahashi et al. | |
| 7,748,904 | B2 | 7/2010 | Henn et al. | |
| 8,540,428 | B2 * | 9/2013 | Nanba | B29C 65/02 383/200 |
| 9,061,776 | B2 | 6/2015 | Kurose et al. | |
| 2005/0063624 | A1 | 3/2005 | Goto et al. | |
| 2008/0149522 | A1 * | 6/2008 | Kim | G07F 17/0092 206/534 |
| 2009/0050644 | A1 | 2/2009 | Yuyama et al. | |
| 2010/0043349 | A1 * | 2/2010 | Yuyama | B65B 5/103 53/52 |
| 2011/0097024 | A1 | 4/2011 | Moehlenbrock et al. | |
| 2012/0201480 | A1 | 8/2012 | Goto et al. | |

FOREIGN PATENT DOCUMENTS

| | | | |
|---|---|---|---|
| CN | 101193802 | A | 6/2008 |
| CN | 201411113 | Y | 2/2010 |
| EP | 0516393 | A1 | 12/1992 |
| EP | 0516393 | B1 | 10/1995 |
| EP | 2067699 | A1 | 6/2009 |
| JP | 57144801 | U | 9/1982 |
| JP | 63169402 | U | 11/1988 |
| JP | 2242748 | A | 9/1990 |
| JP | 7285508 | A | 10/1995 |
| JP | 10118160 | A | 5/1998 |
| JP | 3064794 | U | 9/1999 |
| JP | 2004089235 | A | 3/2004 |
| JP | 2004351111 | A * | 12/2004 |
| JP | 2006001561 | A | 1/2006 |
| JP | 2006232357 | A | 9/2006 |
| JP | 2008273530 | A | 11/2008 |
| JP | 2010253042 | A | 11/2010 |
| JP | 201183378 | A | 4/2011 |
| WO | 2011037021 | A1 | 2/2013 |

OTHER PUBLICATIONS

Office Action re Australian Patent Application No. 2012371953, dated May 20, 2016.

Office Action for European Application No. 12870139.8, dated Dec. 14, 2016.

Chinese Office Action re: 201511001127.6 dated Jun. 21, 2017.

* cited by examiner

TABLET PACKING METHOD AND TABLET PACKING APPARATUS

CROSS-REFERENCE TO RELATED APPLICATION

This application is the United States national phase of International Application No. PCT/JP2012/054975 filed Feb. 28, 2012, the disclosure of which is hereby incorporated in its entirety by reference.

FIELD

The present invention relates to a tablet packing method and a tablet packing apparatus.

BACKGROUND

Conventionally, there is a method of filling tablets prescribed to a patient in a vial bottle (for example, see Patent Literature 1). In the method, one vial bottle is filled with one kind of tablets. Therefore, when there are a plurality of kinds of tablets prescribed to each patient, the same number of vial bottles as the number of kinds of tablets are necessary.

CITATION LIST

Patent Literature

Patent Literature 1: Japanese Patent Laid-Open No. 2006-232357

SUMMARY OF INVENTION

Technical Problem

According to the method, individual vial bottles have certain shapes, such as a cylindrical shape, and there is a problem that the vial bottles are bulky when the tablets are delivered (mailing or the like) from a pharmacy to a patient. When a plurality of kinds of tablets are delivered, a plurality of vial bottles need to be put in an envelope or the like, and there is a problem that the preparation operation of the delivery takes time.

An object of the present invention is to provide a tablet packing method and a tablet packing apparatus suitable for delivery, without bulkiness.

Solution to Problem

The present invention provides a tablet packing method of packing tablets to form a packing bag, the method including: a step of conveying a long sheet material that is a material of the packing bag in a longitudinal direction; a step of introducing all of a same kind of tablets of the tablets prescribed to each patient to a packing space formed by the conveyed long sheet material; a step of sealing the long sheet material to form a section in which the packing space with the tablets introduced therein is airtight; and a step of cutting the long sheet material provided with one or a plurality of the sections, in predetermined units in the longitudinal direction. According to the method, since the tablets are packed by the packing bag made of the long sheet material, the packing bag is not bulky. Since the long sheet material is cut in the predetermined units in the longitudinal direction, the formed packing bag is suitable for delivery.

Furthermore, a step of calculating a quantity of the same kind of tablets before the tablets are introduced to the packing space, a step of determining whether all of the calculated quantity of tablets can be introduced to an area provided with the one section in the packing space, and a step of executing a step of introducing all of the tablets if it is determined that the introduction is possible in the step and executing a step of introducing the same kind of tablets to an area provided with the plurality of sections in the packing space if it is determined that the introduction is impossible may also be included. As a result, packing can be certainly performed even if it is determined that the introduction is impossible.

Furthermore, the long sheet material may include: a sheet body with gas barrier properties; and a fastener arranged to extend in the longitudinal direction that can open and close the formed packing bag. In this way, since the long sheet material includes the sheet body with the gas barrier and includes the fastener, the packing bag can be sealed except when the patient takes out the tablets.

Furthermore, a step of forming a seal extending parallel to the fastener on the sheet body, at a position outside of the fastener in the long sheet material, may also be included. As a result, the seal formed at the position outside of the fastener can certainly seal the packing bag before opening.

Furthermore, a step of determining whether to form the seal extending parallel to the fastener on the sheet body, at the position outside of the fastener in the long sheet material, may also be included.

In the step of cutting the long sheet material, a linear dimension of the long sheet material necessary to pack all of the tablets prescribed to one patient may be set as the predetermined unit in the longitudinal direction to cut the long sheet material.

In the step of cutting the long sheet material, a linear dimension of the long sheet material necessary to pack one kind of tablets may be set as each of the predetermined units in the longitudinal direction to cut the long sheet material.

Furthermore, a step of printing information on a surface of the long sheet material may also be included.

The present invention provides a tablet packing apparatus that packs tablets to form a packing bag, the apparatus including: a long sheet material holder unit that supports a long sheet material in a roll shape, the long sheet material including a long sheet body and a fastener arranged to extend in a longitudinal direction of the sheet body; a long sheet material conveyance unit that conveys the long sheet material in the longitudinal direction from the long sheet material holder unit; a tablet introducing unit that introduces all of a same kind of tablets of the tablets prescribed to each patient to a packing space formed in the conveyed long sheet material; a long sheet material section unit that seals the long sheet material to form a section in which the packing space provided with the tablets is airtight; and a cut unit that cuts the long sheet material provided with one or a plurality of the sections, in predetermined units in the longitudinal direction. According to the configuration, since the tablets are packed by the packing bag made of the long sheet material, the packing bag is not bulky. Since the long sheet material is cut in the predetermined units in the longitudinal direction, the formed packing bag is suitable for delivery.

Advantageous Effects of Invention

The present invention can provide a tablet packing method and a tablet packing apparatus suitable for delivery in which a formed packing bag is not bulky.

DESCRIPTION OF EMBODIMENT

Next, the present invention will be described by taking an embodiment of a tablet packing apparatus for packing tablets to form a packing bag. Objects to be packed in the present invention are tablets. The tablets are substances that living things can take in, such as, for example, capsules, and the tablets widely include substances formed in a shape similar to tablets. Therefore, the objects to be packed in the present invention are not limited to medicine, and the objects to be packed include nutrients (supplements) and the like in tablet-like shapes.

Figure 1:
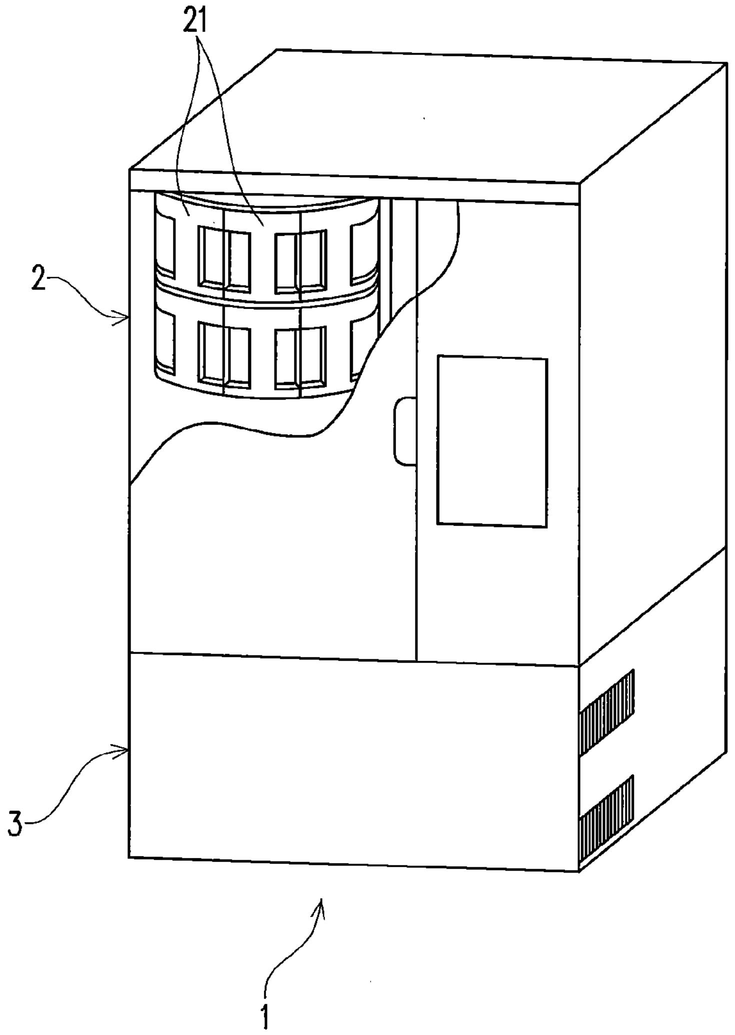
FIG. 1 is a schematic view showing a tablet packing apparatus according to an embodiment of the present invention.

As shown in FIG. 1, a tablet packing apparatus 1 of the present embodiment includes a tablet supply device 2 and an introducing-packing device 3 arranged below the tablet supply device 2. A control unit 11 (see FIG. 4) controls components included in the tablet supply device 2 and the introducing-packing device 3.

The tablet supply device 2 includes a plurality of box-shaped tablet storage cassetters 21. The tablet storage cassetters 21 store tablets T by kind. Openings of the tablet storage cassetters 21 are opened and closed by the control of the control unit 11 (described later). As a result, the tablets T with the kind and quantity corresponding to the prescription can be dispensed to a tablet supply path (not shown) connected to a tablet introducing unit 34 described later.

Figure 2:
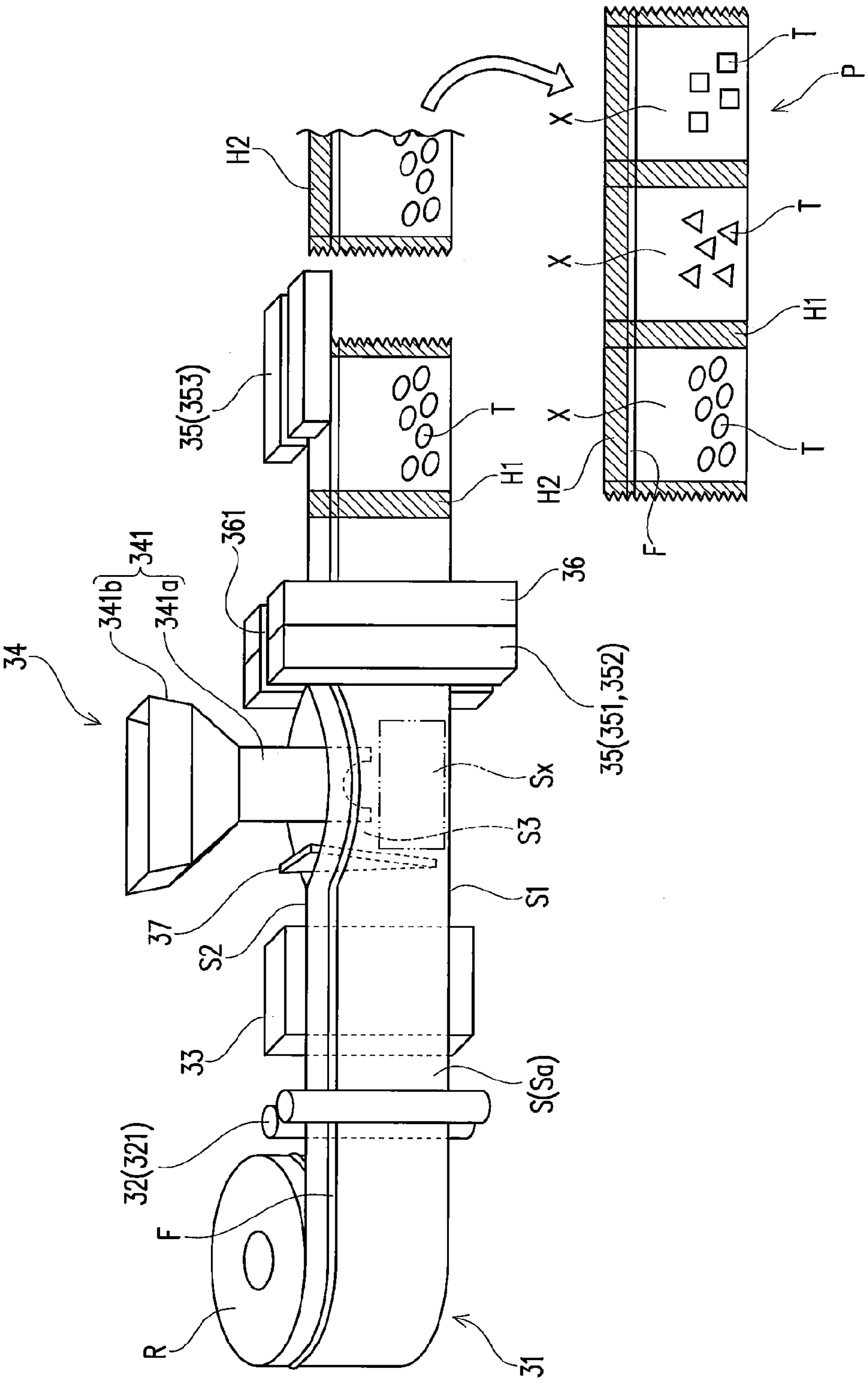
FIG. 2 is a schematic view showing an introducing-packing device according to the embodiment of the present invention.

The introducing-packing device 3 is a device that conveys a long sheet material S to pack the tablets T dispensed from the tablet storage cassetters 21 to form a packing bag P. As shown in FIG. 2, the introducing-packing device 3 includes a long sheet material holder unit 31, a long sheet material conveyance unit 32, a print unit 33, the tablet introducing unit 34, a long sheet material section unit 35, and a cut unit 36.

Here, the long sheet material S used in the present embodiment will be described. The long sheet material S is made of a resin sheet or the like and includes a sheet body Sa with gas barrier properties and a fastener F. Therefore, the long sheet material S blocks the air penetrating in a front and back direction. Although the resin sheet is formed by laminating a plurality of resin films, it is only necessary that at least one resin film in the lamination has gas barrier properties. At least the resin films that appear on the front and back in the lamination are made of a thermoplastic resin to enable heat sealing. An ultraviolet blocking function or a moisture prevention function is provided to the long sheet material S as necessary. The long sheet material S may be transparent, and in that case, the packed tablets T can be easily viewed.

As shown in FIG. 2, the long sheet material S of the present embodiment is set as a wound long sheet material roll R in the long sheet material holder unit 31 in the introducing-packing device 3. The long sheet material S is wound in a roll shape in a state that a fold S1 is formed by folding the long sheet material S in half at the center in a width direction. In this way, since the long sheet material S is folded at the fold S1, a packing space S3 is formed on the long sheet material S conveyed in the introducing-packing device 3, and the tablet introducing unit 34 (described later) introduces the tablets T to the packing space S3. When the introducing-packing device 3 includes a long sheet material folding unit (not shown) for folding the long sheet material S in half at the center in the width direction, a long sheet material roll in an unfolded state can be used. Therefore, the fold S1 may be formed in advance on the long sheet material S or may be formed during the conveyance in the introducing-packing device 3. Two long sheet materials S may be placed on top of each other to form the packing space S3 without forming the fold S1. In that case, the long sheet material section unit 35 or the like needs to form a heat seal, in place of the fold S, on the two long sheet materials S.

The long sheet material roll R is set in the long sheet material holder unit 31 such that the fold S1 is positioned below. The width dimension of the long sheet material S is a dimension suitable for storing 30 to 100 tablets per kind of the tablets T, and the width dimension of the long sheet material S of the present embodiment folded in half is 120 to 200 mm.

The long sheet material S includes the fastener F extending in a longitudinal direction. A conventionally used vial bottle is filled with tablets corresponding to a plurality of doses taken by the patient. Therefore, the vial bottle includes a lid that can be opened and closed. The fastener F according to the present embodiment is equivalent to the lid in the conventional vial bottle. More specifically, when the patient (or a person who receives the object to be packed when the object to be packed is not medicine) takes out the tablets T necessary for administration, the patient can open the fastener F, and the patient can close the fastener F after taking out the tablets T. The fastener F allows the patient to easily seal the packing bag P, and the preservability of the tablets T is excellent.

Figure 3A:
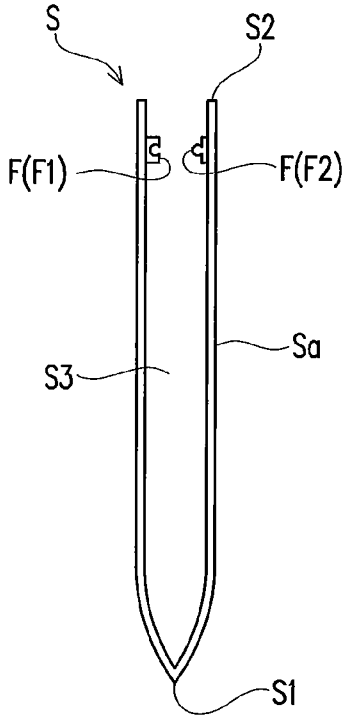
FIG. 3 are schematic views showing a cross section in a width direction of a long sheet material, FIG. 3(A) showing an example in which a fastener is arranged at a position close to an upper end side on the opposite side of a fold of the long sheet mater, FIG. 3(B) showing an example in which the fastener is arranged at a position close to the fold of the long sheet material.
Figure 3B:
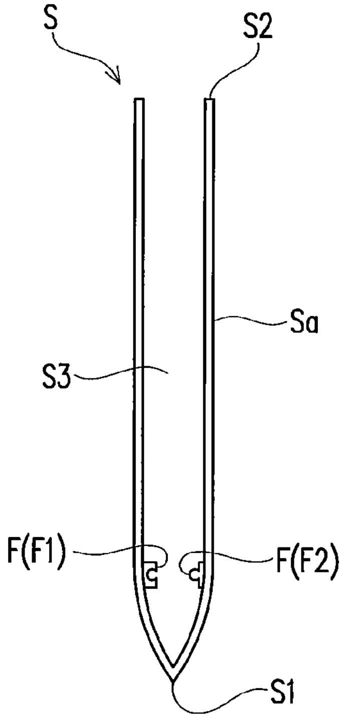

The fastener F is made of a resin and has a well-known configuration. The configuration of the fastener F will be simply described. As shown in FIGS. 3(A) and 3(B), the fastener F of the present embodiment is composed of a combination of a concave member F1 and a convex member F2. With the fold S1 of the long sheet material S in the folded state located between one side and the other side, the concave member F1 is arranged on, for example, the inner surface of the one side, and the convex member F2 is arranged at a position facing the concave member F1 on the inner surface of the other side. The concave member F1 and the convex member F2 can be fitted to close the fastener F to prevent the air from entering, and this can seal the packing bag P. Therefore, the patient can open the packing bag P to take out the tablets T and can seal the packing bag P after taking out the tablets T. In the present embodiment, the long sheet material roll R is formed in the state that the fastener F is adhered in advance to the resin sheet. However, other than this, a long sheet material roll R with a wound resin sheet (sheet body Sa) not including the fastener F and a separate fastener F may be individually set in the introducing-packing device 3, and the fastener F may be attached to the resin sheet during packing by the introducing-packing device 3.

As shown in FIG. 3(A), the fastener F of the present embodiment is arranged at a position close to an upper end side S2 on the opposite side of the fold S1 in the state that the long sheet material S is folded in half at the center in the width direction. In relation to the position of the fastener F in the long sheet material S other than the present embodiment, the fastener F may be arranged, for example, at a position close to the fold S1 as shown in FIG. 3(B). In this way, when the fastener F is arranged at a position close to the fold S1, the tablets T can be introduced without opening the fastener F. Therefore, the concave member F1 and the convex member F2 of the fastener F do not have to be separated by a triangular plate 37 (described later) or the like, and there is an advantage that the long sheet material S can be conveyed while the fastener F is closed. In the long sheet material S shown in FIG. 3(B), the long sheet material S is conveyed in the state that the upper end side S2, which is the bottom side after packing, is opened, and the long sheet material section unit 35 (described later) heat seals the bottom to close the same.

Next, the components of the introducing-packing device 3 will be described. The long sheet material holder unit 31 supports the long sheet material roll R such that the long sheet material S can be pulled out (specific shape is not illustrated). The long sheet material roll R set here is supported to allow turning about the core section of the long sheet material roll R.

The long sheet material conveyance unit 32 pulls out the long sheet material S from the long sheet material roll R supported by the long sheet material holder unit 31 and conveys the long sheet material S in the longitudinal direction (right direction in FIG. 2). The long sheet material S is conveyed by, for example, placing the long sheet material S between rollers 321. The long sheet material conveyance unit 32 conveys the long sheet material S while pausing the conveyance according to each of operations, that is, printing by the print unit 33, introduction of the tablets T from the tablet introducing unit 34, heat sealing by the long sheet material section unit 35, and cutting of the long sheet material S by the cut unit 36. However, the long sheet material S may be continuously conveyed without the pause during the operation of the introducing-packing device 3.

The print unit 33 includes a printer. The print unit 33 prints information related to the prescription and the like, such as tablet name, usage, precautions, barcode (for example, one-dimensional or two-dimensional barcode), contact information of medical institution or pharmacy, on the long sheet material S. The printer has print heads arranged to face the conveyance path of the long sheet material S according to whether the information is printed on one side or both sides of the long sheet material S. Examples of the barcode printed by the print unit 33 include a barcode for managing the medical institution or pharmacy and a barcode corresponding to the homepage address enabling the patient to obtain drug information or information related to the medical institution through the Internet or the like.

The tablet introducing unit 34 includes a hopper 341 that introduces the tablets T to a space (packing space S3) defined by the long sheet material S folded in half. The hopper 341 is connected to openings of the tablet storage cassetters 21 in the tablet supply device 2 through a tablet supply path (not shown).

The hopper 341 includes a hopper body 341*a* and a next-introduction tablet storage 341*b* arranged above the hopper body 341*a*. The hopper body 341*a* has a shape of an expanded upper end and is arranged in the packing space S3 formed between one side and the other side of the long sheet material S in the state that the lower end is folded in half. The lower end of the hopper body 341*a* is located near the upper end side S2 of the long sheet material S and below the fastener F.

The triangular plate 37 is arranged on the upstream of the hopper 341 in the conveyance direction of the long sheet material S. The triangular plate 37 is a plate-shaped body in an inverted isosceles triangle shape viewed in the conveyance direction and is arranged to be inserted in the packing space S3 defined by the long sheet material S folded in half. The triangular plate 37 separates the concave member F1 and the convex member F2 of the fastener F from each other, and the upper end side S2 of the long sheet material S is opened as in the Figure. A space for arranging the tablets T is secured between the lower end of the hopper body 341*a* and the fold S1 of the long sheet material S. As a result of securing the space, a large amount of tablets T can be introduced to the packing space S3 defined by the long sheet material S. The tablets T introduced from the hopper 341 are arranged in an introduction area Sx of the packing space S3 illustrated by an alternate long and two short dashes line in FIG. 2. The triangular plate 37 may be omitted, and the hopper body 341*a* itself may separate the concave member F1 and the convex member F2 of the fastener F from each other.

The next-introduction tablet storage 341*b* is a section that holds in advance the tablets T to be introduced to the packing space S3 later (tablets T that are the next or subsequent ones to be introduced in the introduction order to the packing space S3). Although not illustrated, the next-introduction tablet storage 341*b* includes an open and close lid at the bottom. The control unit 11 opens the open and close lid, and the tablets T held by the next-introduction tablet storage 341*b* drop to the hopper body 341*a*. As a result of the arrangement of the next-introduction tablet storage 341*b*, the tablets T held by the next-introduction tablet storage 341*b* are moved to the hopper body 341*a* immediately after the introduction of the tablets T from the hopper body 341*a* to the long sheet material S, and the tablets T can be quickly introduced to the long sheet material S without intermittence. Therefore, the time required for introducing a plurality of kinds of tablets T to the long sheet material S can be reduced. The next-introduction tablet storage 341*b* may have, for example, two or more divided sections inside, and the tablets T that are the next ones to be introduced in the introduction order and the tablets T that are the third or subsequent ones to be introduced in the introduction order may be able to be held at the same time.

In the packing space S3 formed on the long sheet material S, a plate that prevents the introduced tablets T from getting out of the introduction area Sx to dissipate to the upstream can be arranged on the upstream of the hopper 341. In the present embodiment, the triangular plate 37 also serves as this plate. In the conveyance path of the long sheet material S, at least the upstream around the hopper 341 may be arranged at a position higher than the downstream to prevent the introduced tablets T from dissipating to the upstream.

The long sheet material section unit 35 includes a vertical seal device 351, a fastener closing device 352, and a horizontal seal device 353. In the present embodiment, although the vertical seal device 351 forms a vertical seal H1, the fastener closing device 352 closes the fastener F, the cut unit 36 (described later) cuts the long sheet material S, and then the horizontal seal device 353 forms a horizontal seal H2, the order of forming the seals H1 and H2 and closing the fastener F is not particularly limited.

The vertical seal device 351 is arranged on the downstream in the conveyance direction of the long sheet material S relative to the hopper 341 and forms a heat seal (vertical seal H1) in the width direction of the long sheet material S. The formation of the vertical seals H1 on the long sheet material S defines each section X where the tablets T are positioned in the packing bag P. The section X is specifically defined by the fold S1 of the long sheet material S, the fastener F, and the vertical seals H1 (adjacent two parts at different positions in the longitudinal direction). In the present embodiment, the vertical seals H1 are formed at certain intervals in the longitudinal direction of the long sheet material S to allow checking the weight (weight audit) of the tablets T packed in the packing bags P formed by the tablet packing apparatus 1, and allow the tare weights of the packing bags P in the same length to be uniform.

All of the same kind of tablets T are positioned in each section X defined as described above. More specifically, the number of kinds of tablets T and the number of sections X usually coincide. However, if the quantity of the same kind of tablets T exceeds the maximum storage quantity of one section X due to the size and the quantity of tablets T, the same kind of tablets T may be introduced to a plurality of consecutive sections X. Therefore, in this case, all of the same kind of tablets T are introduced in a plurality of times. In this case, the printing content of the print unit 33 also needs to be changed. The vertical seal device 351 may include a blade section provided with intermittent edges (not shown), so that, at the same time as the formation of the vertical seal H1, intermittent cut lines (perforations) may be formed in the width direction of the long sheet material S at the position of the vertical seal H1.

The fastener closing device 352 presses the long sheet material S from the front and back sides to bring the concave member F1 and the convex member F2 of the fastener F into fitting engagement with each other to close the fastener F. As the fastener F is closed, the section X is sealed along with the formation of the vertical seal H1 by the vertical seal device 351. Therefore, the vertical seal device 351 and the fastener closing device 352 together form the section X in which the packing space S3 with the tablets T therein is airtight. The fastener closing device 352 of the present embodiment is integrated with the vertical seal device 351. However, as shown in FIG. 3(B), if the fastener F is arranged at a position close to the fold S1, and the long sheet material S is conveyed while the fastener F is closed, the fastener closing device 352 is not necessary.

The horizontal seal device 353 is arranged on the downstream in the conveyance direction of the vertical seal device 351. Although the horizontal seal device 353 of the present embodiment is arranged separately from the vertical seal device 351, the horizontal seal device 353 may be integrated with the vertical seal device 351. The horizontal seal device 353 forms a heat seal (horizontal seal H2) for closing a position outside of the fastener F relative to the packing space S3, parallel to the fastener F. The horizontal seal H2 can prevent accidental opening of the fastener F before the patient opens the packing bag P and can prevent contamination or loss of the tablets T. Unauthorized opening of the packing bag P by a person other than the patient can also be prevented. The horizontal seal H2 is formed as necessary, and whether to form the horizontal seal H2 can be selected. The patient cuts off the horizontal seal H2 when the patient opens the packing bag P. Therefore, the horizontal seal device 353 may include a blade section (not shown) that forms, between the horizontal seal H2 and the fastener F, a cut line for assisting cutting to thereby form a cut line at the same time as the formation of the horizontal seal H2. When the long sheet material S provided with the fastener F close to the fold S1 is used as shown in FIG. 3(B), the horizontal seal device 353 is arranged to form the horizontal seal H2 at a position close to the upper end side S2 on the opposite side of the fold S1 of the long sheet material S. In this case, the patient cuts off the part around the fold S1 when the patient opens the packing bag P. When the long sheet material S shown in FIG. 3(B) is used, the section X is sealed by the formation of the vertical seal H1 and the horizontal seal H2.

The cut unit 36 faces the front and back surfaces of the long sheet material S and includes blade sections 361 that can be pressed against the front and back surfaces. The cut unit 36 cuts, across in the width direction, the long sheet material S in the state that the vertical seal H1 is formed by the vertical seal device 351 and that the fastener F is closed by the fastener closing device 352. As a result, one packing bag P is formed. The long sheet material S is cut in predetermined units in the longitudinal direction of the long sheet material S. The introducing-packing device 3 includes a sensor (not shown) that can detect a detection target amount corresponding to the conveyance state of the long sheet material S, and the cut unit 36 cuts the long sheet material S based on the detection target amount detected by the sensor. Although the detection target amount is the number of vertical seals H1 in the present embodiment, the detection target amount may be the length of the long sheet material S. The number of vertical seals H1 is a number corresponding to the number of blank bags without the tablets T and the number of sections X with the tablets T. In the present embodiment, although the number of consecutive sections X is set to 3, and the number of vertical seals H1 corresponding to the consecutive number is detected, the number of consecutive sections X for the detection may be set to another number.

The predetermined unit of cutting can be arbitrarily set, and for example, the linear dimension of the consecutive long sheet material S necessary to pack the tablets T prescribed to each patient or the linear dimension of the long sheet material S necessary to pack one kind of tablets T may be the predetermined unit. When the packed tablets T are delivered from a pharmacy to the patient, the predetermined unit of cutting can be set within a limited size of a standard delivery envelope that can be delivered at a low price in each nation or country. In the present embodiment, every consecutive three sections (about 300 mm in the linear dimension) of the sections provided with the tablets T are cut according to the longitudinal dimension of the standard delivery envelope. Therefore, after the cutting by the cut unit 36, one packing bag P with three connected sections X is formed as shown in FIG. 2. The number of consecutive sections X to be cut can be set in various ways. When a plurality of packing bags P to be delivered at one time are formed, the operator may forget or neglect to put part of the packing bags P in the standard delivery envelope or the like. On the other hand, the formation of one packing bag P in the present embodiment can prevent such forgetting or neglect. Since the formation of one packing bag P for one patient is recommended in order to prevent such forgetting or neglect, the cutting may be performed at a length (for example, the number of consecutive sections X is 4 or 6) exceeding the limited size on the premise that the packing bag P is folded back on the condition that the thickness is within a prescribed thickness of the standard delivery envelope.

The packing bag P with the tablets T packed therein that is cut by the cut unit 36 is lighter and thinner than the conventional vial bottle and is compact. The packing bag P is cut in the predetermined unit, and the sections X are continuous. The packing bag P formed in the present embodiment is compact and is unlikely to be bulky because the sections X are continuous. Since the fastener F can seal the sections X in the packing bag P, the patient can easily seal the packing bag P, and the preservability of the tablets T is excellent. The long sheet material S with an ultraviolet blocking function or a moisture prevention function can be used to form the packing bag P with excellent weather resistance and better preservability.

The control unit 11 of the tablet packing apparatus 1 is constituted by an electronic circuit including a microprocessor, a RAM, and the like and controls the components of the tablet supply device 2 and the introducing-packing device 3.

Figure 4:
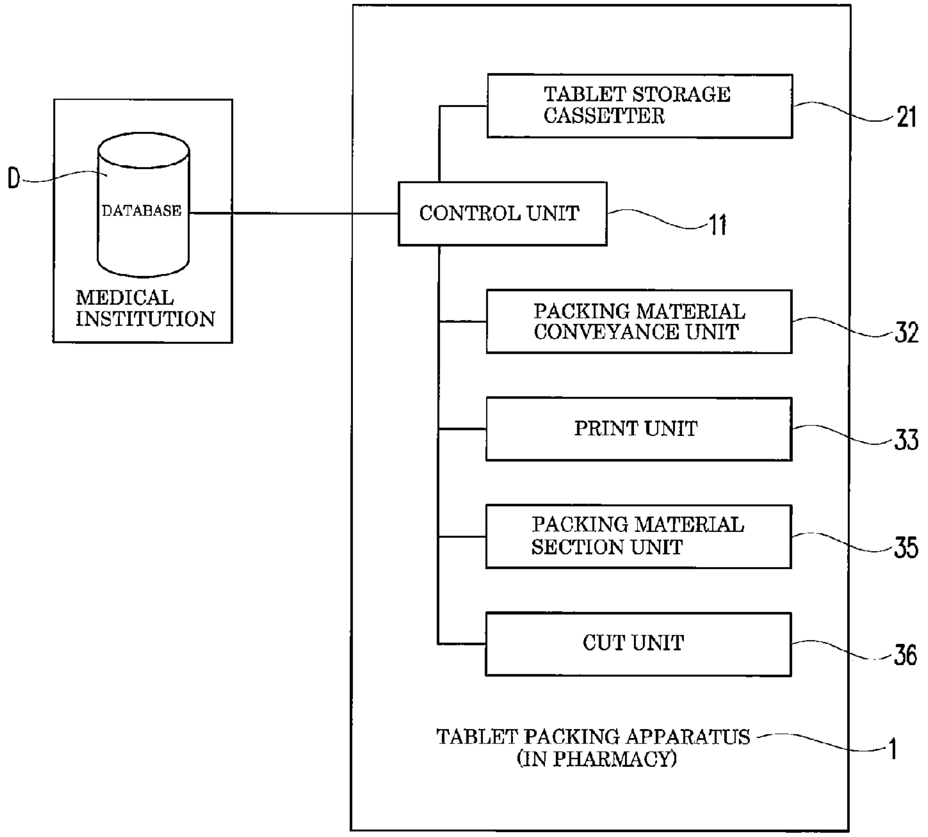
FIG. 4 is a block diagram in relation to operation for tablet packing in the tablet packing apparatus according to the embodiment of the present invention.
Figure 5:
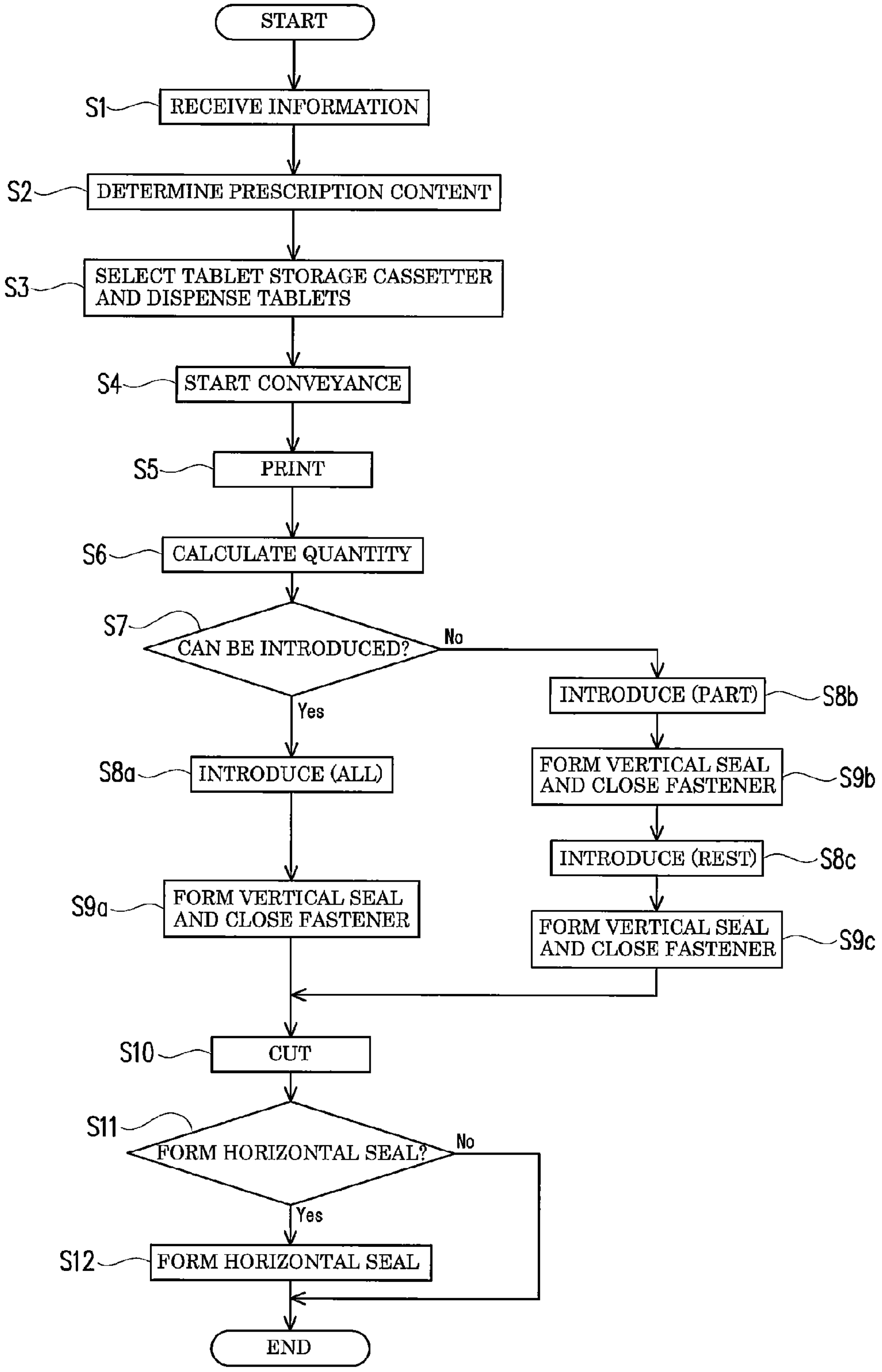
FIG. 5 is a flow diagram in relation to operation for tablet packing in the tablet packing apparatus according to the embodiment of the present invention.

Next, an example of operation for tablet packing in the tablet packing apparatus 1 will be described with reference to FIG. 4 (block diagram) and FIG. 5 (flow diagram). As shown in FIG. 4, patient information and prescription information are first transmitted from a database D (including a computer (CPU) in relation to transmission) located in a medical institution to the tablet packing apparatus 1 located in a pharmacy. Particularly, when the tablets T are delivered from the pharmacy to the patient, delivery destination information (information such as address) of the patient is also transmitted from the database D.

When the tablet packing apparatus 1 receives the information (step S1), the control unit 11 determines the content of the prescription (step S2). Specifically, the kinds of the prescribed tablets T and the total amount of each kind of the tablets T are determined. The control unit 11 calculates the total amount of tablets T from information related to the number of tablets taken by the patient at a time, the number of times a day the tablets are taken, and the number of days the tablets are taken.

The control unit 11 dispenses the tablets by selecting the tablet storage cassetter 21 that dispenses the tablets T according to the prescription (step S3). In this case, the tablet storage cassetter 21 that dispenses the tablet T next (second in the introduction order) is also selected. The control unit 11 can adjust the order of dispensing according to the total amount of each kind of tablets T. For example, the tablets T with a small total amount can be dispensed first, and the tablets T with a large total amount can be dispensed later.

Substantially at the same time as the selection of the tablet storage cassetter 21, the control unit 11 controls the long sheet material conveyance unit 32 to start conveying the long sheet material S from the long sheet material holder unit 31 (step S4).

Next, the control unit 11 controls the print unit 33. In this way, the print unit 33 performs printing on the long sheet material S (step S5). The control unit 11 or the print unit 33 itself creates the printing content on the basis of the patient information and the prescription information.

Next, the control unit 11 calculates the quantity of the same kind of tablets T among the tablets T prescribed to each patient (patient by patient) (step S6). The number is calculated based on the content of the prescription determined in step S2. The control unit 11 determines whether all of the calculated quantity of tablets can be introduced to the introduction area Sx in the packing space S3 where one section X is formed (step S7).

If the control unit 11 determines that all of the calculated quantity of tablets can be introduced (specifically, if the quantity of the same kind of tablets T to be packed is equal to or smaller than the maximum storage quantity of the introduction area Sx where one section X is formed), the hopper 341 introduces all of the same kind of tablets T dispensed from the tablet storage cassetter 21 to the introduction area Sx of the long sheet material S (step S8*a*). Next, the control unit 11 controls the long sheet material section unit 35 to cause the vertical seal device 351 in the long sheet material section unit 35 to form the vertical seal H1 and to cause the fastener closing device 352 in the long sheet material section unit 35 to close the fastener F (step S9*a*).

On the other hand, if the control unit 11 determines that not all of the calculated tablets can be introduced (specifically, if the quantity of the same kind of tablets T to be packed exceeds the maximum storage quantity of the introduction area Sx where one section X is formed), the hopper 341 introduces part of the same kind of tablets T dispensed from the tablet storage cassetter 21 to the introduction area Sx of the long sheet material S (step S8*b*). Next, the control unit 11 controls the long sheet material section unit 35 to cause the vertical seal device 351 in the long sheet material section unit 35 to form the vertical seal H1 and to cause the fastener closing device 352 in the long sheet material section unit 35 to close the fastener F (step S9*b*). Next, the hopper 341 introduces the rest of the same kind of tablets T dispensed from the tablet storage cassetter 21 to the introduction area Sx of the long sheet material S (step S8*c*). Next, the control unit 11 controls the long sheet material section unit 35 to cause the vertical seal device 351 in the long sheet material section unit 35 to form the vertical seal H1 and to cause the fastener closing device 352 in the long sheet material section unit 35 to close the fastener F (step S9*c*). Therefore, if the control unit 11 determines that not all of the calculated quantity of tablets can be introduced, all of the same kind of tablets T dispensed from the tablet storage cassetter 21 are introduced in a plurality of times, and the long sheet material section unit 35 forms the vertical seal H1 and closes the fastener F every time the tablets T are introduced.

Next, the control unit 11 controls the cut unit 36. In this way, the cut unit 36 cuts the long sheet material S (step S10). In the parts other than the part cut by the cut unit 36, the section on one side and the section on the other side adjacent in the longitudinal direction with the vertical seal H1 therebetween are connected. The control unit 11 (or the cut unit 36) counts the number of blank bags (parts between two vertical seals H1, but without the tablets T) detected by the sensor (not shown) and the number of sections X by detecting the number of vertical seals H1 and cuts the position substantially at the center of the vertical seal H1 when the counted value reaches a predetermined number. As a result, the packing bag P in the state without the formation of the horizontal seal H2 is formed.

Next, the control unit 11 determines whether to form the horizontal seal H2 on the packing bag P (step S11). Specifically, the control unit 11 checks whether the tablet packing apparatus 1 is set to form the horizontal seal H2. If the tablet packing apparatus 1 is set to form the horizontal seal H2, the control unit 11 controls the horizontal seal device 353 in the long sheet material section unit 35 to form the horizontal seal H2. As a result, the horizontal seal device 353 forms the horizontal seal H2 (step S12). On the other hand, if the tablet packing apparatus 1 is not set to form the horizontal seal H2, the horizontal seal device 353 does not form the horizontal seal H2.

In this way, fabrication of the packing bag P is completed. Along with the formation of the packing bag P, the tablet packing apparatus 1 may continuously perform operation of putting the packing bag P in the envelope for delivery. Along with the formation of the packing bag P, the delivery destination display of the patient may be printed on the label by a label printer or may be directly printed on the surface of the envelope for delivery.

REFERENCE SIGNS LIST

T Tablet
P Packing bag
S Long sheet material
S3 Packing space
Sx Introduction area
X Section
Sa Sheet body
F Fastener
H1 Vertical seal
H2 Horizontal seal
1 Tablet packing apparatus
2 Tablet supply device
3 Introducing-packing device
31 Long sheet material holder unit
32 Long sheet material conveyance unit
34 Tablet introducing unit
35 Long sheet material section unit
36 Cut unit

The invention claimed is:

1. A tablet packing apparatus comprising:

a supply part that supplies tablets;

a packing part that packs the tablets supplied by the supply part; and a control part that controls the supply part and the packing part;

wherein the packing part is configured to form at least one air-tight sealed section by a sheet material, and provide each of the at least one air-tight sealed section with an openable and closable fastener;

wherein the fastener is configured to be capable of individually opening and closing each of the at least one air-tight sealed section; and wherein the control part is configured to control the supply part and the packing part so as to be able to obtain at least one packing bag each having the at least one air-tight sealed section each storing the same kind of tablets prescribed to each patient for multiple doses.

2. The tablet packing apparatus according to claim 1, wherein the control part is configured to determine whether all of the same kind of tablets can be stored in a single air-tight sealed section, and store the same kind of tables in the single air-tight sealed section, if it is determined that the storage in the single air-tight sealed section is possible; and control the supply part and the packing part to store the same kind of tablets in plural air-tight sealed sections, if it is determined that the storage in the single air-tight sealed section is impossible.

3. The tablet packing apparatus according to claim 1, wherein the packing part is configured to form a seal in the sheet material at a position outside of the fastener.

4. The tablet packing apparatus according to claim 1, wherein the packing part is configured to form the at least one section by the sheet material while conveying the sheet material.

5. The tablet packing apparatus according to claim 4, further comprising a cut part that cuts the sheet material with the at least one section formed therein.

6. The tablet packing apparatus according to claim 5, wherein the control part is configured to control the cut part so as to cut the sheet material with the at least one section formed therein for each patient.

7. The tablet packing apparatus according to claim 1, further comprising: a print part that prints information related to the prescription and the like on a surface of the sheet material.

* * * * *